US009047600B2

(12) United States Patent
Zhou et al.

(10) Patent No.: US 9,047,600 B2
(45) Date of Patent: Jun. 2, 2015

(54) MOBILE AND WEARABLE DEVICE PAYMENTS VIA FREE CROSS-PLATFORM MESSAGING SERVICE, FREE VOICE OVER INTERNET PROTOCOL COMMUNICATION, FREE OVER-THE-TOP CONTENT COMMUNICATION, AND UNIVERSAL DIGITAL MOBILE AND WEARABLE DEVICE CURRENCY FACES

(71) Applicants: Andrew H B Zhou, Tiburon, CA (US); Tiger T G Zhou, Tiburon, CA (US); Dylan T X Zhou, San Gabriel, CA (US)

(72) Inventors: Andrew H B Zhou, Tiburon, CA (US); Tiger T G Zhou, Tiburon, CA (US); Dylan T X Zhou, San Gabriel, CA (US)

( * ) Notice: Subject to any disclaimer, the term of this patent is extended or adjusted under 35 U.S.C. 154(b) by 0 days.

(21) Appl. No.: 14/334,992

(22) Filed: Jul. 18, 2014

(65) Prior Publication Data
US 2014/0330656 A1 Nov. 6, 2014

Related U.S. Application Data

(63) Continuation-in-part of application No. 13/623,944, filed on Sep. 21, 2012, and a continuation-in-part of application No. 13/185,491, filed on Jul. 18, 2011, and a continuation-in-part of application No. 14/154,446,
(Continued)

(51) Int. Cl.
*G06Q 40/00* (2012.01)
*G06Q 20/00* (2012.01)
(Continued)

(52) U.S. Cl.
CPC .......... *G06Q 20/322* (2013.01); *G06Q 20/4014* (2013.01); *G06Q 2220/00* (2013.01); *G06Q 20/3274* (2013.01); *G06Q 20/40145* (2013.01); *G06Q 20/3823* (2013.01)

(58) Field of Classification Search
CPC ............ G06Q 20/3255; G06Q 20/327; G06Q 20/322; G06Q 20/10; G06Q 20/12; G06Q 20/32; G06Q 20/4014; G06Q 20/3823; G06Q 20/3274; G06Q 20/40145; G06Q 2220/00; H04W 4/12
See application file for complete search history.

(56) References Cited

U.S. PATENT DOCUMENTS 6,985,748 B2 1/2006 Knotts
7,774,231 B2 8/2010 Pond et al.
(Continued)

FOREIGN PATENT DOCUMENTS

WO 2013127713 A1 9/2013

OTHER PUBLICATIONS

Chowdhury et al., Virtuak Currency and the Financial System: The Case of Bitcoin, Dec. 2013.
(Continued)

*Primary Examiner* — Daniel Walsh
(74) *Attorney, Agent, or Firm* — Patent Jurist; Georgiy L. Khayet

(57) ABSTRACT

Provided are computer implemented methods and systems for facilitating mobile and wearable device payments and multimedia transfer. The method commences with receiving a multimedia transfer request from a mobile and wearable device associated with a sender. The method further comprises receiving a recipient identifier. The recipient identifier is associated with a mobile and wearable device associated with a recipient. The method continues with transferring the multimedia content to the recipient. The transfer is based on the recipient identifier. The method further comprises receiving a transaction request from the sender. The transaction request includes one or more of a currency amount, the recipient identifier, and payment data associated with the sender. The method further comprises encrypting transaction data. The transaction data includes one or more of the currency amount and the payment data associated with the sender. The method continues with performing a transaction based on the transaction request.

12 Claims, 10 Drawing Sheets

Related U.S. Application Data filed on Jan. 14, 2014, and a continuation-in-part of application No. 13/875,311, filed on May 2, 2013, and a continuation-in-part of application No. 13/620,775, filed on Sep. 15, 2012, and a continuation-in-part of application No. 13/661,207, filed on Oct. 26, 2012, now abandoned, and a continuation-in-part of application No. 13/760,214, filed on Feb. 6, 2013, now Pat. No. 9,016,565, and a continuation-in-part of application No. 13/973,146, filed on Aug. 22, 2013, and a continuation-in-part of application No. 13/753,855, filed on Jan. 30, 2013, and a continuation-in-part of application No. 13/776,852, filed on Feb. 26, 2013, and a continuation-in-part of application No. 14/165,826, filed on Jan. 28, 2014, and a continuation-in-part of application No. 14/198,683, filed on Mar. 6, 2014, now Pat. No. 8,968,103.

(51) Int. Cl.
*G06Q 20/32* (2012.01)
*G06Q 20/40* (2012.01)
*G06Q 20/38* (2012.01)

(56) References Cited

U.S. PATENT DOCUMENTS

| | | | |
|---|---|---|---|
| 8,107,956 B2 | 1/2012 | Vakil et al. | |
| 8,332,475 B2 | 12/2012 | Rosen et al. | |
| 8,341,086 B2 | 12/2012 | Goodrich et al. | |
| 8,396,808 B2 | 3/2013 | Greenspan | |
| 8,516,529 B2 | 8/2013 | Lajoie et al. | |
| 8,548,426 B2 | 10/2013 | Smith | |
| 2002/0025828 A1* | 2/2002 | Turetzky et al. | 455/550 |
| 2002/0103711 A1* | 8/2002 | Karas et al. | 705/26 |
| 2004/0004128 A1* | 1/2004 | Pettinelli et al. | 235/462.41 |
| 2004/0098276 A1* | 5/2004 | Blazey et al. | 705/1 |
| 2006/0094466 A1* | 5/2006 | Tran | 455/558 |
| 2006/0200568 A1* | 9/2006 | Kim | 709/227 |
| 2006/0294007 A1* | 12/2006 | Barthelemy | 705/40 |
| 2007/0168266 A1* | 7/2007 | Questembert | 705/35 |
| 2009/0106152 A1* | 4/2009 | Dill et al. | 705/44 |
| 2009/0234764 A1* | 9/2009 | Friesen | 705/35 |
| 2010/0042535 A1 | 2/2010 | Stone | |
| 2010/0198733 A1* | 8/2010 | Gantman et al. | 705/75 |
| 2010/0280948 A1* | 11/2010 | Cohen | 705/42 |
| 2012/0054102 A1 | 3/2012 | Schwartz et al. | |
| 2012/0290418 A1* | 11/2012 | Itwaru | 705/16 |
| 2012/0294352 A1 | 11/2012 | Koum et al. | |
| 2012/0330844 A1* | 12/2012 | Kaufman | 705/67 |
| 2013/0060689 A1* | 3/2013 | Oskolkov et al. | 705/42 |
| 2013/0275309 A1* | 10/2013 | Kwong | 705/71 |
| 2014/0006184 A1* | 1/2014 | Godsey | 705/16 |
| 2014/0006195 A1* | 1/2014 | Wilson | 705/21 |
| 2014/0025571 A1* | 1/2014 | Dooley et al. | 705/40 |

OTHER PUBLICATIONS

Chowdhury et al., Virtual currency and the financial system: the case of bitcoin, Dec. 2013.

Moon Ihlwan, In Korea, Cell Phones Get a New Charge, Mar. 1, 2006.

* cited by examiner

MOBILE AND WEARABLE DEVICE PAYMENTS VIA FREE CROSS-PLATFORM MESSAGING SERVICE, FREE VOICE OVER INTERNET PROTOCOL COMMUNICATION, FREE OVER-THE-TOP CONTENT COMMUNICATION, AND UNIVERSAL DIGITAL MOBILE AND WEARABLE DEVICE CURRENCY FACES

CROSS-REFERENCE TO RELATED APPLICATIONS

This application is a Continuation-In-Part of U.S. patent application Ser. No. 13/620,775, filed on Sep. 15, 2012, titled "METHODS AND SYSTEMS FOR FACILITATING MOBILE DEVICE PAYMENTS USING CODES AND CASHBACK BUSINESS MODEL", U.S. patent application Ser. No. 13/185,491, filed on Jul. 18, 2011, titled "FACILITATING MOBILE DEVICE PAYMENTS USING PRODUCT CODE SCANNING", U.S. patent application Ser. No. 13/875,311, filed on May 2, 2013, titled "FACILITATING MOBILE DEVICE PAYMENTS USING MOBILE PAYMENT ACCOUNT, MOBILE BARCODE AND UNIVERSAL DIGITAL MOBILE CURRENCY", U.S. patent application Ser. No. 13/661,207, filed Oct. 26, 2012, titled "METHODS AND SYSTEMS FOR RECEIVING COMPENSATION FOR USING MOBILE PAYMENT SERVICES", U.S. patent application Ser. No. 13/623,944, filed Sep. 21, 2012, titled "FACILITATING MOBILE DEVICE PAYMENTS USING PRODUCT CODE SCANNING TO ENABLE SELF CHECKOUT", U.S. patent application Ser. No. 13/753,855, filed Jan. 30, 2013, titled "WEARABLE PERSONAL DIGITAL EYEGLASS DEVICE", U.S. patent application Ser. No. 14/154,446, filed Jan. 14, 2014, titled "SYSTEMS AND METHODS FOR ISSUING MOBILE PAYMENT CARDS VIA A MOBILE COMMUNICATION NETWORK AND INTERNET-CONNECTED DEVICES", U.S. patent application Ser. No. 14/165,826, filed Jan. 28, 2014, titled "SYSTEMS AND METHODS TO OWN A FREE COMPUTER, A FREE MOBILE DEVICE AND A FREE WEARABLE DEVICE AND LIFE TIME WARRANTY VIA THE SAME DEVICE PAYMENT CASHBACK", U.S. patent application Ser. No. 13/760,214, filed Feb. 6, 2013, titled "WEARABLE PERSONAL DIGITAL DEVICE FOR FACILITATING MOBILE DEVICE PAYMENTS AND PERSONAL USE", U.S. patent application Ser. No. 13/776,852, filed Feb. 26, 2013, titled "WEARABLE PERSONAL DIGITAL FLEXIBLE CLOUD GAME, MULTIMEDIA, COMMUNICATION AND COMPUTING DEVICE", U.S. patent application Ser. No. 13/973,146, filed Aug. 22, 2013, titled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND", and U.S. patent application Ser. No. 14/198,683, filed Mar. 6, 2014, titled "SYSTEMS AND METHODS FOR DIGITAL MULTIMEDIA CAPTURE USING HAPTIC CONTROL, CLOUD VOICE CHANGER, AND PROTECTING DIGITAL MULTIMEDIA PRIVACY", which are incorporated herein by reference in their entirety for all purposes.

FIELD

This application relates generally to data processing and, more specifically, to multimedia message communication and mobile and wearable device transactions using encrypted digital currency.

BACKGROUND

When customers buy product items from various merchants in retails environments, such as retail outlets, shopping centers, stores, and so forth, only a handful of payment methods is available to the customers. Typical examples include credit cards, debit cards, gift cards, checks, and cash. Each one of these payment methods has some drawbacks from cost and/or convenience perspectives. For example, checks and cash transactions are slow and require additional processing and/or handling. All these drawbacks interfere with retail transactions and add some level of dissatisfaction. The credit or debit cards are associated with a bank account of a customer and are usually given to the customer while opening the bank account. Credit cards require substantial processing fees, while debit cards require availability of funds and sometimes involve surcharges as well. Typically, interchange and processing fees for a complete credit/debit card transaction may reach a significant amount.

At the same time, the customer typically visits a number of retails environments. Continuous carrying multiple retail cards (or other security/transactional devices) every time when visiting a retail environment of a merchant is inconvenient for the customer. Using a mobile payment service, the customer may save on processing fees, as well as may be able to pay any time without carrying cash or any credit cards, debit cards, gift cards, or checks.

Additionally, personal digital communication devices, such as smartphones, are evolving rapidly and more and more people prefer using personal digital communication devices for a numerous purposes. One of such purposes is to send messages to other users of personal digital communication devices. Current mobile operators enable sending text, image, or audio massages but such kinds of service are chargeable. Furthermore, sending a file having a big size, e.g. a video file, can be problematic due to restriction of mobile operators as to the maximum size of a file to be sent. Furthermore, current messaging clients offering real-time text transmission over the Internet are supposed for a certain operation system. However, communication between users having different operation systems may face problems.

Moreover, although available mobile operators or messaging clients (for example, Snapchat, Skype, WhatsApp Messenger) solve the problem of sending various types of messages, they do not provide any means for performing transactions between users. The users need to use a separate software or browser-based client for making payments. Additionally, the users may have to pay a transfer fee for each payment.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for facilitating mobile and wearable device payments and multimedia transfer. The method for facilitating mobile and wearable device payments and multimedia transfer commences with receiving a multimedia transfer request from a mobile and wearable device associated with a sender. The method further comprises receiving a recipient identifier. The recipient identifier is associated with a mobile and wearable device associated with a recipient. The method continues with transferring the multimedia content to the recipient. The transfer is based on the recipient identifier. The method further comprises receiving a transaction request from the sender. The transaction request includes one or more of a currency amount, the recipient identifier, and payment data associated with the sender. The transaction request is associated with transaction data. The method further comprises encrypting the transaction data. The transaction data includes one or more of the currency amount and the payment data associated with the sender. The method continues with performing a transaction based on the transaction request. According to the method, the sender and the recipient are registered in a mobile payment service associated with the mobile and wearable device associated with the sender and the mobile and wearable device associated with the recipient. The mobile payment service provides at least a cross-platform messaging service, a Voice over Internet Protocol (VoIP) service, and an Over-the-Top (OTT) service. The mobile payment service is associated with a universal digital mobile and wearable device currency.

The system for facilitating mobile and wearable device payments and multimedia transfer comprises one or more processors and a database. The database comprises computer-readable instructions for execution by the processors. The processors are operable to receive a multimedia transfer request from a mobile and wearable device associated with a sender. The processors are further operable to receive a recipient identifier. The recipient identifier is associated with a mobile and wearable device associated with a recipient. Based on the recipient identifier, the processors are operable to transfer the multimedia content to the recipient. Furthermore, the processors are operable to receive, a transaction request from the sender. The transaction request includes one or more of a currency amount, the recipient identifier, and payment data associated with the sender. The transaction request is associated with transaction data. The processors are further operable to encrypt the transaction data. The transaction data including one or more of the currency amount and the payment data associated with the sender. Based on the transaction request the processors are operable to perform a transaction. The sender and the recipient are registered in a mobile payment service associated with the mobile and wearable device associated with the sender and the mobile and wearable device associated with the recipient. The mobile payment service provides at least a cross-platform messaging service, a VoIP service, and an OTT service. The mobile payment service is associated with a universal digital mobile and wearable device currency.

Provided are computer implemented methods and systems for facilitating mobile device payments using a mobile payment account. When a customer is ready to tender a payment to a merchant, instead of using a credit card, cash, or check, the customer activates an application on his mobile device associated with a mobile payment account of the user. The mobile payment account may be associated with a mobile payment service provider and created on a request of the user. The mobile payment account may be associated with user information provided by the user to the mobile payment service provider. The user information may include a name of the user, a social security number of the user, a phone number, an address, a bank account number, an insurance account number, a financial organization account number, and so forth. The mobile device may obtain information about the payment system of a merchant. Furthermore, the mobile device may generate a payment barcode that encodes data of the mobile payment account. The mobile device may display the payment barcode on a display. The displayed barcode may be scanned by a barcode scanner of the merchant and processed to retrieve data of the mobile payment account. Based on this data, a payment request may be generated and sent to the mobile payment service provider. The mobile payment service provider may then transfer funds from the mobile account of the user to the merchant. The mobile payment account may be charged based on a payment request. The payment request may be associated with the data of the mobile payment account retrieved from the payment barcode. The mobile payment account may comprise funds stored on in a form of a universal digital mobile and wearable device currency.

In certain embodiments, a computer implemented method for facilitating mobile device payments using a mobile payment account may involve scanning a product code corresponding to the product item to retrieve product information and information about the payment system of this merchant. This operation may be performed using a mobile device.

In certain embodiments, a product code may include one or more of the following codes: a Unified Product Code (UPC) represented as a barcode and/or an alphanumeric string, an Electronic Product Code (EPC) encoded as a printed barcode or encoded on Radio Frequency Identification (RFID) tag, or any other variations of linear barcode, two dimensional barcodes, alphanumeric string (e.g., 8-bit, 16-bit, 32-bit string), electronically encoded codes (e.g., 96-bit strings).

Examples of mobile devices may include a cellular phone, a Personal Digital Assistant (PDA), a personal computer (e.g., a tablet or a laptop), a barcode scanner, and an RFID scanner. In general, any device that can be carried by a user into a retail environment, capable of retrieving one or more types of codes listed above, and capable of wirelessly communicating (e.g., via Wi-Fi network, 3G or 4G cellular network, or any other types of wireless communication networks) may be used. In certain embodiments, a mobile device may include a user interface for entering an alphanumeric entry corresponding to the product code. The same or another user interface may be used for entering authorization information.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
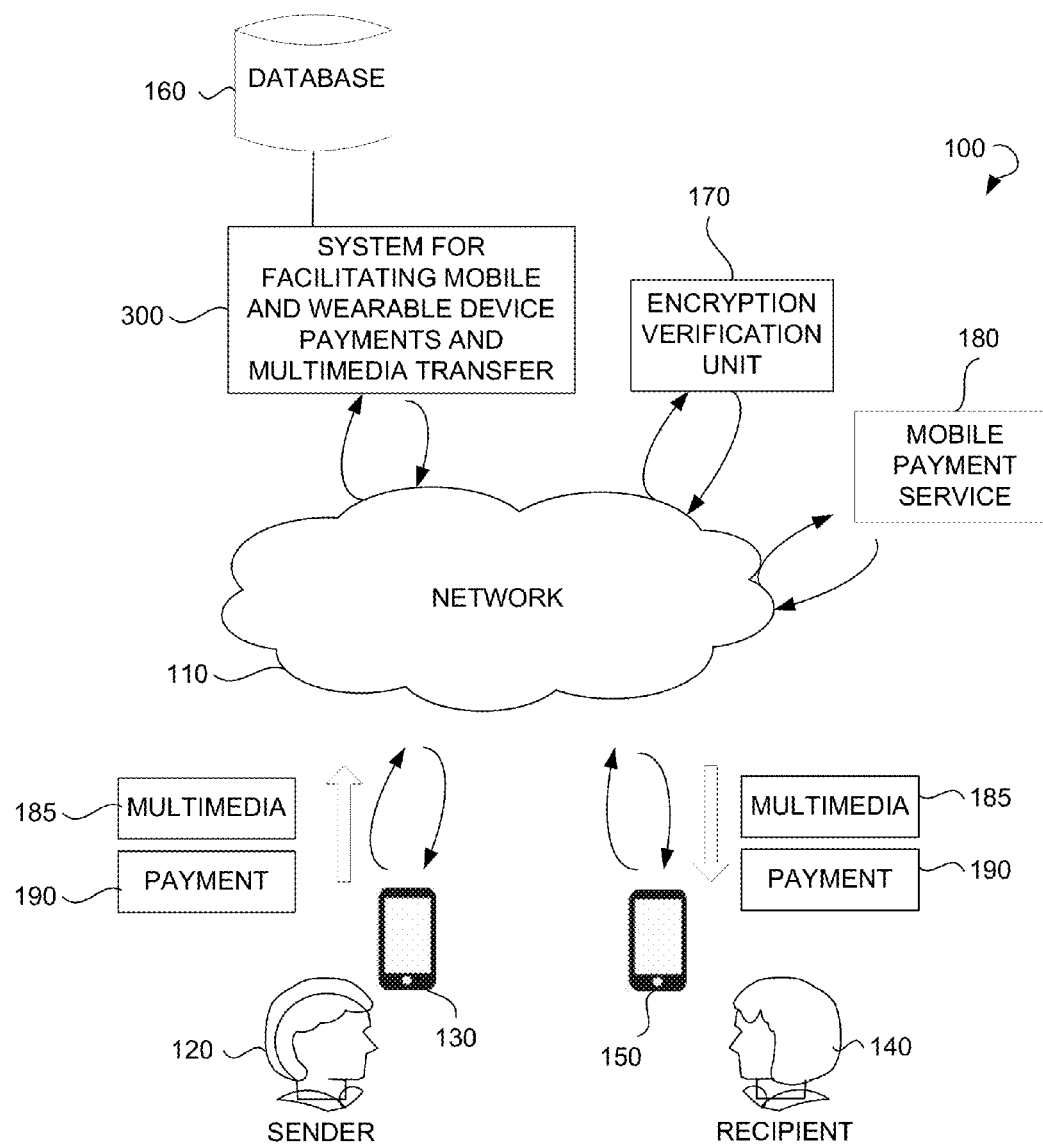
FIG. 1 is a block diagram illustrating an example of the overall system in which various embodiments may be implemented.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for facilitating mobile and wearable device payments and multimedia transfer are described herein. Recent proliferation of mobile and wearable devices (e.g., a mobile phone, a smartphone, a tablet personal computer, a laptop, a wearable personal digital device, and other similar devices) that are capable of transmitting and receiving various multimedia files via a network allows implementing these methods and systems. Most users of mobile and wearable devices enjoy message communication with other users, as well as performing and receiving payments using the mobile and wearable devices.

The methods and system of the present disclosure refer to a cross-platform instant messaging subscription service for mobile and wearable devices. A cross-platform application can be directly run on any platform without special preparation. In particular, the cross-platform instant messaging subscription service may run on Android, iOS, BlackBerry OS, Symbian, Windows Phone, and so forth. Instant messaging provides for real-time text transmission over the Internet. The cross-platform instant messaging subscription service uses the same network the users use for email communication and web browsing. Therefore, the cross-platform instant messaging subscription service allows the users to exchange messages without having to pay mobile operators for message transmission. The messages that can be sent by the users include text, image, audio, video, geographical location massages, and so forth. The users can pay a subscription price to have an access to the service for a certain period of time. In example embodiments, the message communication is provided using a free cross-platform messaging service, a free VoIP service, a free OTT service, and so forth.

The methods and systems for facilitating mobile and wearable device payments and multimedia transfer of the present disclosure also include a mobile payment service. The mobile payment service is associated with digital currency and provides digital currency transactions between users. The mobile payment service enables worldwide peer-to-peer transactions between the users.

The digital currency of the mobile payment service is an encrypted currency that uses cryptography to control creation and transfer of the currency. In order to increase security of the currency, the currency is customized according to user personal data. For example, the user sends a currency request to the mobile payment service. In response to the currency request, the mobile payment service creates digital currency associated with the user. In particular, user personal data can be present on the digital currency, for example, an image of a user face can be provided on the digital currency. Such currency having the user face printed on it can be referred to as "universal digital mobile and wearable device currency faces" or "currency faces".

The systems described herein may be financial systems associated with mobile payment accounts, optical codes (e.g., barcodes) generated by a mobile device, a universal digital mobile and wearable device currency, and mobile credits associated with the mobile payment accounts. Upon providing user personal data via a user interface of the mobile device, a user may receive a mobile payment account from a mobile payment service provider. The mobile device may include a mobile phone, a personal digital assistant, a lap-top, a tablet PC, a smart phone, a wearable personal digital device, and so forth. The mobile payment account may be used for performing financial transactions, for example, for buying products or services. The mobile payment service provider may include any financial organization, such as a bank, an insurance company, and the like, that may provide the mobile payment account to the user upon receipt of the user information. The mobile payment service provider may be associated with chain stores, for example, Starbucks, and franchise organizations, such as McDonald's, to operate a large scale banking service of these organizations without bank charges.

The user information, provided to register a mobile payment account, may include a name of the user, a social security number of the user, a phone number, an address, a bank account number, an insurance account number, a financial organization account number, and the like. In some embodiments, the mobile payment account may not be associated with any credit card of the user. On the contrary, access to the mobile payment account may be given through the mobile device of the user, for example, by installing an application on the mobile device. The application may be associated with the data of the mobile payment account of the user and may communicate with the mobile payment service provider to update the data of the mobile payment account.

The user may access the mobile payment account any time and may perform any operations, such as pay for a product, transfer funds to a banking account or another mobile payment account, make a deposit to the mobile payment account, and so forth.

When the user is ready to tender a payment for products or services, instead of using a credit card, cash, or check, the user may activate an application on his mobile device. The mobile device may generate and display a barcode that encodes data of the mobile payment account.

The data of the mobile payment account may be stored in a memory unit of the user mobile device or a remote secure cloud server. Additionally, the data of the mobile payment account may be stored in a database of the mobile payment service provider. Upon a request of the user, the data of the mobile payment account may be displayed on a display of the user mobile device, for example, in a form of a barcode being scannable by a barcode scanner.

In some embodiments, information about a receiver of the payment may be sent to the mobile payment service provider by the receiver himself after he retrieves the data encoded in the payment barcode. In other embodiments, the information about the merchant may be obtained, for example, by product code scanning. Product codes are typically provided as barcodes, such as linear barcodes and two dimensional barcodes, as well as human readable alphanumeric code. Displaying a barcode may involve processing information to encode into a barcode image. The local processing may be performed using various software applications installed on the mobile device. For example, the Universal Product Code (UPC) or European Article Number (EAN) may be used. UPC is a barcode symbology widely used in North America and other countries for tracking trade items in stores. Its most common form, the UPC-A, consists of 12 numerical digits, which are uniquely assigned to each individual trade/product item. Each UPC-A barcode consists of a scannable strip of black bars and white spaces, above a sequence of 12 numerical digits. No letters, characters, or other content of any kind may appear on a standard UPC-A barcode. The digits and bars maintain a one-to-one correspondence. In other words, there is only one way to represent each 12-digit number visually, and there is only one way to represent each visual barcode numerically. EAN is another example developed as a superset of UPC and adding an extra digit to the beginning of every UPC number. EAN-13 barcodes also indicate the country in which the company that sells the product is based using leading digits. EAN and UPC barcodes are currently the only barcodes allowed for scanning trade/product items at the point of sale. However, other codes may be available in the future and within the scope of this document.

One having ordinary skills in the art would understand that the term "scanning" is not limited to printed codes having particular formats but can be used for codes encoded electronically and using various other means. For example, product codes may be in the form of the recently developed Electronic Product Code (EPC) designed as a universal identifier that provides a unique identity for every physical object (not just a trade item category) anywhere in the world. It should be noted that EPCs are not exclusively used with RFID data carriers. They can be constructed based on reading of optical data carriers, such as linear bar codes and two-dimensional bar codes, such as Data Matrix symbols. For purposes of this document, all optical data carriers are referred herein as "barcodes."

Scanning a barcode may involve capturing an image of the barcode using a simple imaging device installed on a mobile device, such as a digital camera. The image may be then processed on the mobile device to retrieve corresponding product information or sent to the server for further processing. The local processing may be performed using various software installed on the mobile device. In certain embodiments, a mobile device may contain a local database to match the retrieved product information with additional information about this product. However, because of variable nature of this additional information (e.g., pricing, product description), a mobile device then typically transmits the retrieved product information to the server and then receives some additional information from the server.

In some embodiments, funds may be stored on the mobile payment account in a form of universal digital mobile and wearable device currency. The universal digital mobile and wearable device currency may be created by the mobile payment service provider. In other embodiments, one or more of conventional virtual money systems may be used as the universal digital mobile and wearable device currency. The universal digital mobile and wearable device currency may be used in various operations performed with mobile payment account, for example, users of the system for facilitating mobile device payments may transfer funds to each other in the universal digital mobile and wearable device currency, may pay for products or services, for example, in on-line gaming systems for buying virtual products in on-line games, and so forth.

The methods described herein may be performed by any mobile devices with wireless communication capabilities. In addition to being capable of transmitting voice-based signals, many modern cell phones have internet connectivity using cellular networks (e.g., 3G, 4G) as well as Wi-Fi and other types of networks. Some additional examples of such networks are described below with reference to FIG. 1. Wireless communication may be used to transmit retrieved product information to a payment server, receive replies, and transmit authorizations. Overall, various data may be exchanged between the mobile and payment server as well as other servers during operations of the method.

Referring now to the drawings, FIG. 1 illustrates an environment 100 within which a method and a system for facilitating mobile and wearable device payments and multimedia transfer can be implemented. The environment 100 includes a network 110, a sender 120, a sender digital device 130, a recipient 140, a recipient digital device 150, a system 300 for facilitating mobile and wearable device payments and multimedia transfer, a database 160, an encryption verification unit 170, and a mobile payment service 180. The sender digital device 130 and the recipient digital device 150 include a mobile phone, a lap-top, a personal computer (PC), a tablet PC, a smart phone, a wearable personal digital device, a wearable eyeglass communication device, and so forth.

The network 110 includes the Internet or any other network capable of communicating data between devices. Suitable networks includes or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 includes a network of data processing nodes that are interconnected for the purpose of data communication.

The sender 120 includes a person that performs sending multimedia messages 185 and performing payments 190 to the recipient 140. The multimedia includes different multimedia types, such as text, image, audio, video, animation, and the like. The payment 190 is associated with digital currency. The multimedia messages and payment data may be stored in the database 160.

The sender 120 selects a multimedia message 185 to be sent to the recipient 140 and sends the multimedia message 185 to the recipient 140. The recipient 140 uses the recipient digital device 150 to receive and review the multimedia message 185 received from the sender 120. In an example embodiment, the sender digital device 130 encrypts a multimedia message 185 before sending. The encryption details are sent to the encryption verification unit 170 and stored in the encryption verification unit 170. After receiving of the multimedia message 185 by the recipient 140 and an attempt of the recipient 140 to view the multimedia message 185, the encryption verification unit 170 verifies whether the recipient 140 is allowed to view the multimedia message 185.

Furthermore, the sender 120 selects an amount of payment 190 to be transferred to the recipient 140 and sends a transfer request to the mobile payment service 180. The mobile payment service 180 transfers the amount of the payment 190 to the recipient digital device 150. The encryption verification unit 170 encrypts data associated with the transfer request.

Figure 2:
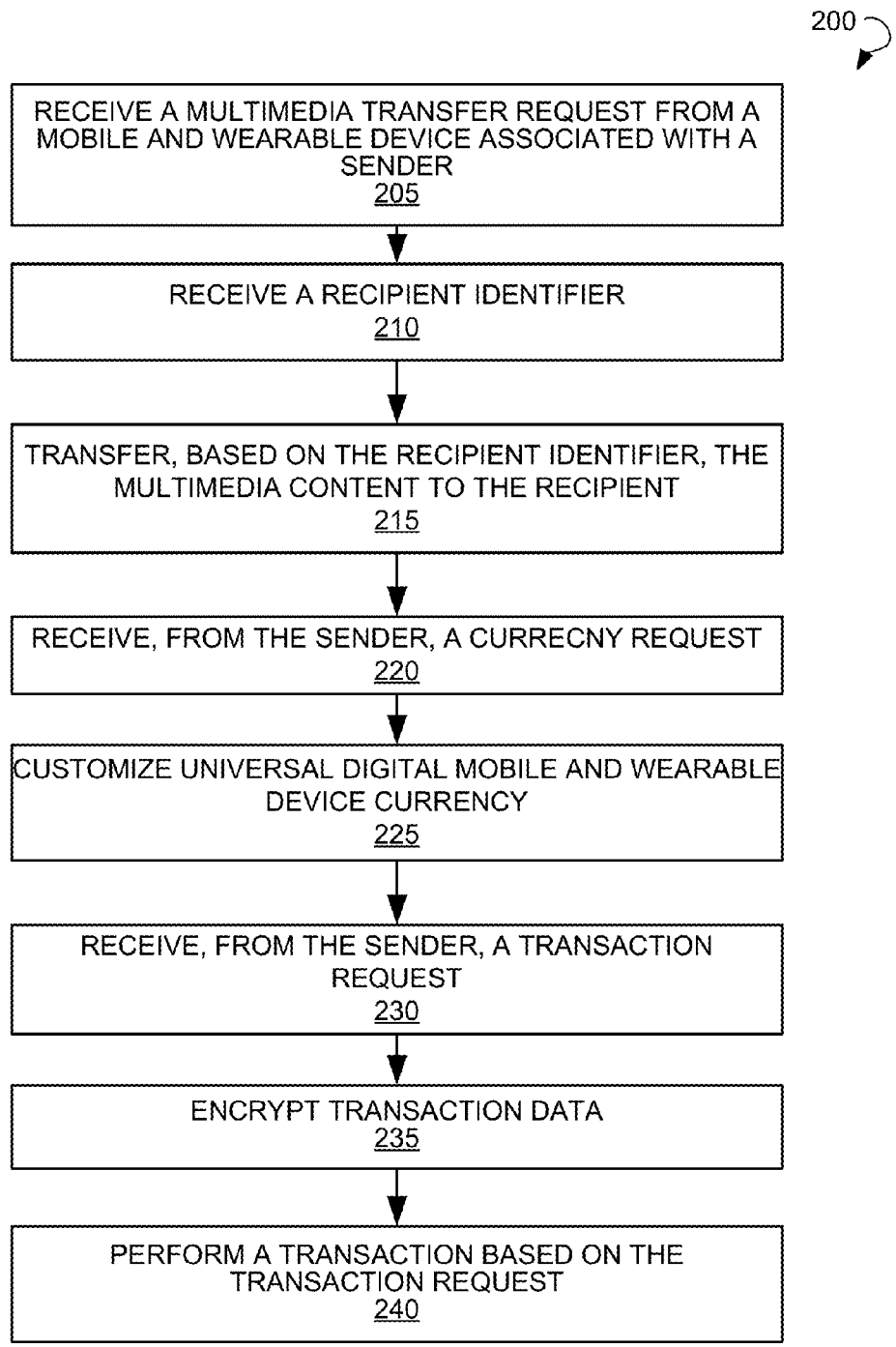
FIG. 2 is a flow chart illustrating a method for facilitating mobile and wearable device payments and multimedia transfer, in accordance with certain embodiments.

FIG. 2 is a flow chart illustrating a computer implemented method 200 for facilitating mobile and wearable device payments and multimedia transfer, in accordance with certain embodiments. The method 200 starts with receiving, by one or more processors, a multimedia transfer request from a mobile and wearable device associated with a sender at operation 205. In example embodiments, the multimedia transfer request includes one or more of a text transfer request, a video transfer request, an image transfer request, an audio transfer request, an animation transfer request, a geographical location data transfer request, and so forth.

At operation 210, the method 200 continues with receiving, by the one or more processors, a recipient identifier. The recipient identifier is associated with a mobile and wearable device associated with a recipient. In example embodiments, the recipient identifier includes one or more of a phone number of the recipient, a phone model of the mobile and wearable device associated with the recipient, and an operation system version of the mobile and wearable device associated with the recipient.

Upon receiving the recipient identifier, the method 200 further continues with transferring, by the one or more processors, the multimedia content to the recipient at operation 215. The transferring is based on the recipient identifier.

The sender and the recipient may be registered in a mobile payment service associated with the mobile and wearable device associated with the sender and the mobile and wearable device associated with the recipient. The mobile payment service is a peer-to-peer payment service and provides at least a cross-platform messaging service, a VoIP service, and an OTT service. The VoIP service allows for the delivery of voice communications and multimedia sessions over Internet Protocol (IP) networks, such as the Internet. The VoIP is associated with IP telephony, Internet telephony, voice over broadband (VoBB), broadband telephony, IP communications, and broadband phone service. The OTT service refers to delivery of video, audio and other media over the Internet without a mobile provider being involved in the control or distribution of the content. A mobile provider may be aware of the contents of the IP packets but is not responsible for, nor able to control, the viewing abilities, copyrights, and/or other redistribution of the content. The mobile payment service may be associated with a universal digital mobile and wearable device currency.

In an example embodiment, the mobile payment service may be associated with fingerprint payments by swiping a finger across a touchscreen of the mobile and wearable device associated with the sender and may be further associated with one or more of the following: transactional payments based on Unstructured Supplementary Service Data (USSD), Short Message Service (SMS), direct operator billing, credit card mobile payments, prepaid card payments, online wallets, QR-code payments, contactless near field communication, cloud-based mobile payments, audio signal-based payments, Bluetooth Low Energy (BLE) signal beacon payments, in-application payments, software development kit (SDK) payments, application programming interface (API) payments, social networking payments, direct carrier/bank co-operation, and the like.

The method 200 may continue with receiving, from the sender, a currency request at operation 220. The currency request include, for example, amount of the currency to the given to the sender. In response to the currency request, the universal digital mobile and wearable device currency may be customized in the mobile payment service at operation 225. The customization may include printing an image on the universal digital mobile and wearable device currency. The currency in the mobile payment service may be customized according to data associated with the sender. In an example embodiment, the customization includes printing an image on the universal digital mobile and wearable device currency. The image includes an image of a sender face. In some embodiments, to provide the universal digital mobile and wearable device currency with artistic value, the image may be an image of a public figure, a fashion designer, a movie character, and so forth. The sender may have his own portrait for the universal digital mobile and wearable device currency or the image may be made from currency bills reassembled into the faces of politicians and cultural figures.

The method 200 continues with receiving, by the one or more processors, a transaction request from the sender at operation 230. The transaction request includes a currency amount, the recipient identifier, and payment data associated with the sender. The mobile payment service is associated with a universal digital mobile and wearable device currency.

In an example embodiment, verification of the sender face may be performed to prevent an identity theft. For example, the image of the sender face may be taken by a camera of the mobile and wearable device associated with the sender. The captured image of sender face may be recognized and compared to those stored on the mobile and wearable device associated with the sender. In an example embodiment, the camera may recognize the sender face without capturing the image.

Biometrics may be used to recognize and match unique patterns in human faces. In an example embodiment, when a sender registers in a mobile payment service, an image of the sender face may be provided to the mobile payment service and is linked to the sender account in the mobile payment service. The sender account in the mobile payment service may be linked to a payment account of the sender. To initiate a payment on a point-of-sale, the sender may access a barcode needed to complete a transaction from the sender account in mobile payment service. The barcode may also contain the image of the sender face. Therefore, the barcode and the sender face may be a way of representing information. The barcode may be displayed on a display of the mobile and wearable device of the sender. After the merchant at the point-of-sale scans the barcode, the image of the sender face may appear on a screen associated with a point-of-sale system. The merchant may use that image to verify the sender and complete the transaction.

A sender face on the universal digital mobile and wearable device currency and face verification feature may have the potential of the universal digital mobile and wearable device currency to replace the central bank currency. Considering its characteristics only, the universal digital mobile and wearable device currency can become the dominant payment instrument.

In an example embodiment, the universal digital mobile and wearable device currency may be a digital equivalent of virtual cash with the sender face both for sender prestige and verification of sender identity. The universal digital mobile and wearable device currency may be stored on a mobile and wearable electronic device associated with the sender, the mobile and wearable device associated with a recipient, and a remote server. The sender and the recipient may store the required amounts of universal digital mobile and wearable device currency and use the universal digital mobile and wearable device currency for payments. The universal digital mobile and wearable device currency also may act as electronic money being stored on and used via internet-based payment accounts.

The transaction request is associated with transaction data. At operation 235 the transaction data is encrypted by the one or more processors. The transaction data includes the currency amount and the payment data associated with the sender. In example embodiments, the encryption includes assigning a unique key to the transaction data. The method 200 optionally comprises sending the unique key to an encryption verification unit. In example embodiments, the encryption verification unit includes a key storage.

In a further example embodiment, the universal digital mobile and wearable device currency includes an encrypted currency, also referred to as cryptocurrency. The encrypted currency is encrypted using principles of cryptography being a technology used in online banking. Unlike fiat currency with central banks and online banking, the encrypted currency discussed herein is created using peer reviewed cryptographic ciphers, thus removing the need to trust a central authority. Thus, transfer of the encrypted currency does not require trust of any third party.

Upon encryption of the transaction data, at operation 240, a transaction of the currency to the recipient is performed based on the transaction request. After performing the transaction, the method 200 optionally comprises receiving a currency conversion request from the recipient. In response to the currency conversion request, the currency received from the sender is converted into a currency associated with the recipient. In particular, the conversion includes replacing the image on the universal digital mobile and wearable device currency with an image of a recipient face.

Printing the face on the digital currency is an additional security feature that enables worldwide peer-to-peer transactions with no risk of chargebacks or fraud. At the same time, both sender and recipient are immune to seizure or confiscation of the currency.

In a further example embodiment, the method 200 may comprise receiving a sales point search request from the mobile and wearable device associated with the sender. In response to the sales point search request, a current location of the mobile and wearable device associated with the sender may be determined. Upon determining, a list of sales points, such as stores and restaurants that accept payments in the universal digital mobile and wearable device currency and are located in proximity to the current location of the mobile and wearable device associated with the sender may be displayed on mobile and wearable device associated with the sender. Once the sender checks in to a sales point online, name and photo of the sender may appear on the display of the sales point. The sender can then use the universal digital mobile and wearable device currency to pay for items, and a merchant may complete the transaction by clicking on the name or photo of the sender shown on the display of the sales point.

In a further example embodiment, the sender may upload the payment data associated with the sender and an image of a sender face to a cloud storage. A merchant may have a card associated with the mobile payment service and a unique merchant barcode for each of point-of-sale terminals. The merchant barcode may be associated with merchant account data. The sender may scan a merchant barcode at the point-of-sale terminal. The identity of the sender may be checked, for example, the sender face may be scanned by the camera of the mobile and wearable device and compared with the image of the sender face stored on the mobile and wearable device or in the cloud storage. Upon successful identity check, the merchant account data may be retrieved from the merchant barcode. The universal digital mobile and wearable device currency of the sender may be transferred to the merchant account.

In a further example embodiment, the merchant may use a printer to print a merchant invoice with barcodes encoding merchant account data on the invoice. The sender may scan the merchant invoice to retrieve the merchant account data.

Figure 3:
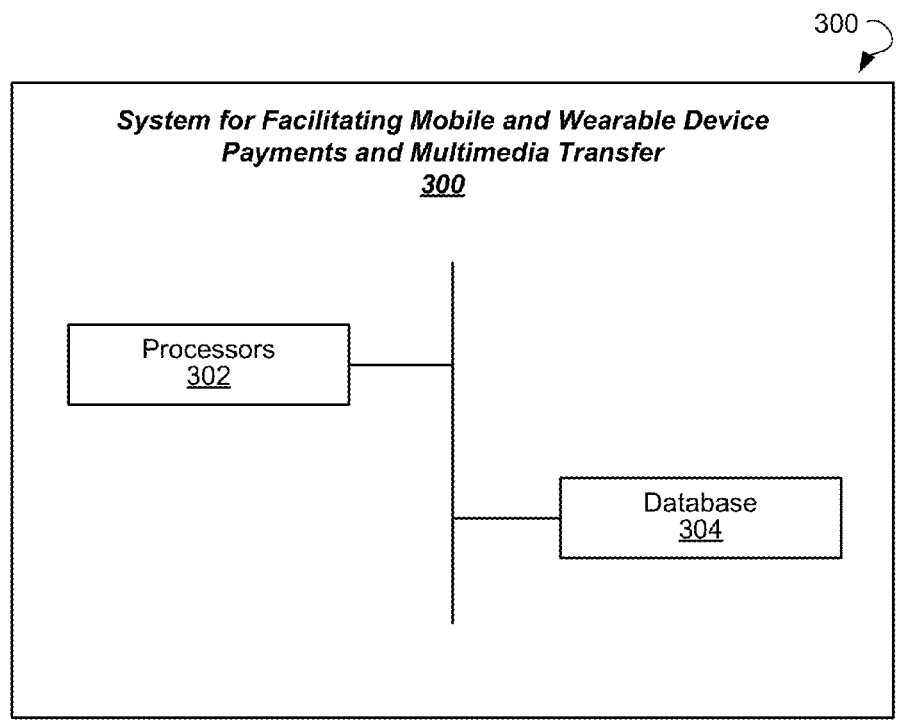
FIG. 3 is a block diagram showing various modules of a system for facilitating mobile and wearable device payments and multimedia transfer, in accordance with certain embodiments.

FIG. 3 is a block diagram showing various modules of a system 300 for facilitating mobile and wearable device payments and multimedia transfer, in accordance with certain embodiments. Specifically, the system 300 includes one or more processors 302. The processors 302 are operable to receive a multimedia transfer request from a mobile and wearable device associated with a sender. In an example embodiment, the multimedia transfer request includes one or more of a text transfer request, a video transfer request, an image transfer request, an audio transfer request, an animation transfer request, a geographical location data transfer request, and so forth. Furthermore, the processors 302 are operable to receive a recipient identifier. In an example embodiment, the recipient identifier includes one or more of a phone number of the recipient, a phone model of the mobile and wearable device associated with the recipient, an operation system version of the mobile and wearable device associated with the recipient, and so forth. The recipient identifier is associated with a mobile and wearable device associated with a recipient. Based on the recipient identifier, the processors 302 are operable to transfer the multimedia content to the recipient.

The processors 302 are further operable to receive, from the sender, a transaction request. The transaction request includes one or more of a currency amount, the recipient identifier, payment data associated with the sender, and so forth. The transaction request is associated with transaction data. The processors 302 are further operable to encrypt the transaction data. The transaction data including one or more of the currency amount and the payment data associated with the sender. In an example embodiment, the encryption includes assigning a unique key to the transaction data. Based on the transaction request, the processors 302 are operable to perform a transaction. The sender and the recipient can be registered in a mobile payment service associated with the mobile and wearable device associated with the sender and the mobile and wearable device associated with the recipient.

The mobile payment service provides at least a cross-platform messaging service, a VoIP service, and an OTT service. The mobile payment service is a peer-to-peer payment service associated with a universal digital mobile and wearable device currency. The universal digital mobile and wearable device currency includes an encrypted currency.

In further example embodiments, the processors 302 are operable to receive a currency request from the sender. In response to the currency request, the processors 302 are operable to customize a currency in the mobile payment service. The customization includes printing an image on the universal digital mobile and wearable device currency. The image can be a photo of the sender, e.g. an image of a sender face.

In further example embodiments, the processors 302 are operable to receive a currency conversion request from the recipient. In response to the currency conversion request, the processors 302 are operable to convert the currency received from the sender. The conversion includes replacing the image on the universal digital mobile and wearable device currency with an image of a recipient face.

The system 300 further comprises a database 304 comprising computer-readable instructions for execution by the one or more processors 302.

Figure 4:
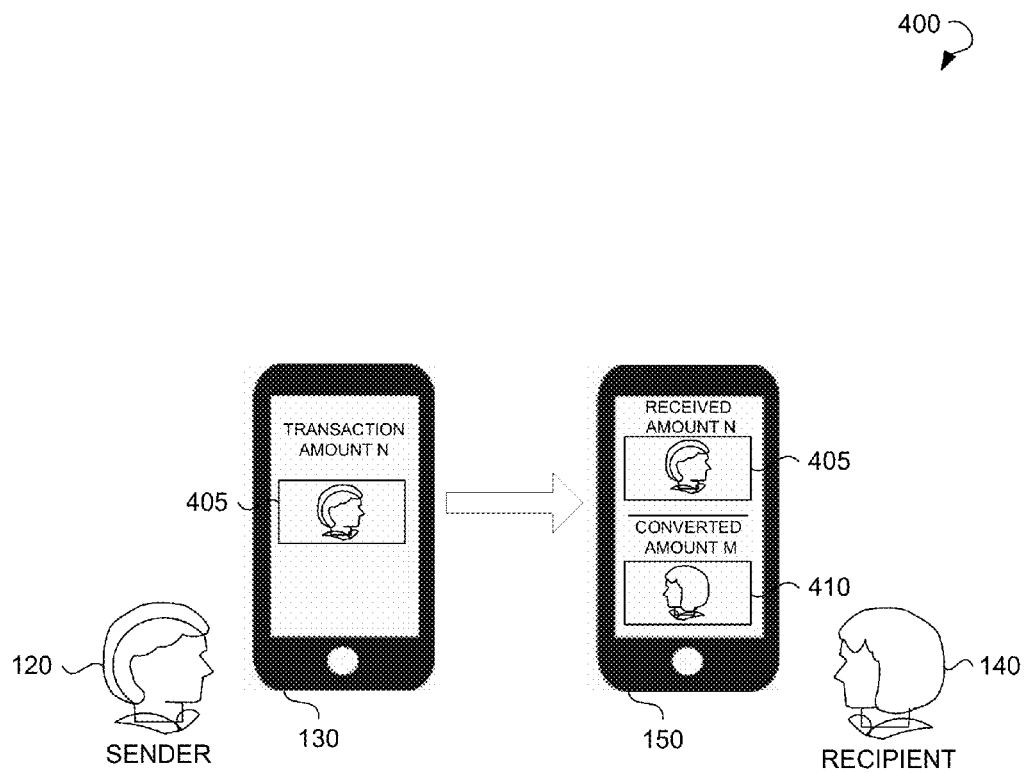
FIG. 4 is a schematic diagram for currency transfer, in accordance with certain embodiments.

FIG. 4 is a schematic diagram 400 for currency transfer between a sender 120 and a recipient 140. The sender 120 uses a sender digital device 130 to select an amount of currency 405 to be transferred to the recipient 140. The currency 405 is associated with the sender 120. In particular, a sender face is printed on the currency 405. The selected amount of the currency 405 is sent to a recipient digital device 150. The recipient 140 receives the currency 405 and sends a request to convert at least partially the received amount of the currency 405 into currency 410 associated with the recipient 140. During the conversion, the sender face is replaced with a recipient face. Therefore, the currency 410 in obtained with the recipient face printed on it.

Figure 5:
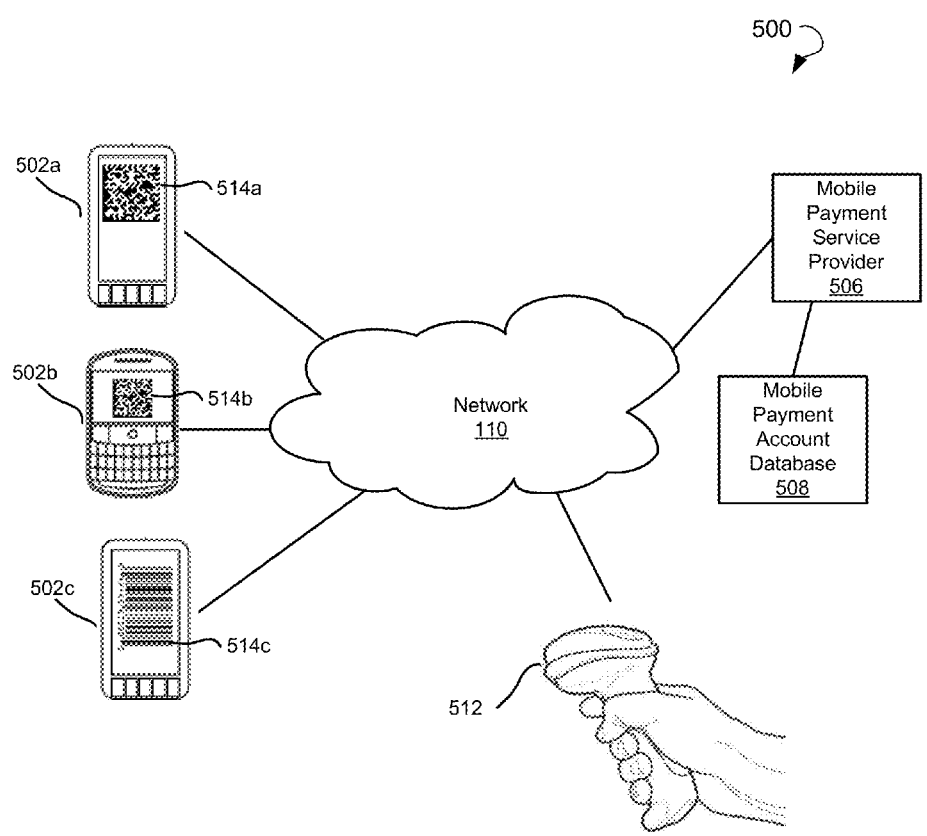
FIG. 5 is a block diagram illustrating an example of scanning barcodes displayed by mobile devices, in accordance with certain embodiments.

FIG. 5 illustrates an example scanning barcodes displayed by the mobile devices by a barcode scanner. As shown, multiple mobile devices 502a, 502b, 502c may be configured to display barcodes 514a, 514b, 514c. Various examples of barcodes are described above. The barcodes displayed by the mobile devices 502a, 502b, 502c may be scannable by a barcode scanner 512, or another mobile device. Mobile devices 502a, 502b, 502c may communicate with a mobile payment service provider 506 via a network 110. The mobile payment service provider 506 may include a mobile payment account database 508. The network 504 may be also used for communication among various components of the system for facilitating mobile device payments.

Figure 6:
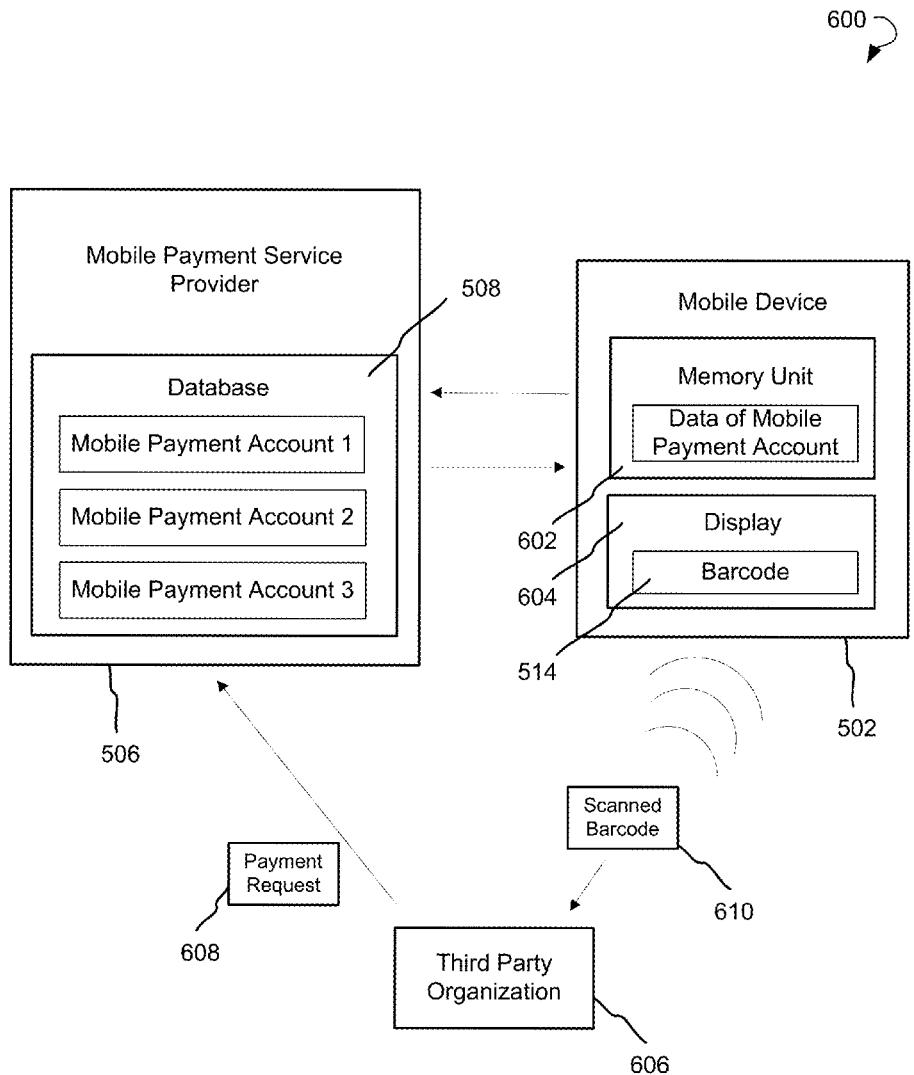
FIG. 6 is a schematic representation of elements of a system for facilitating mobile device payments using a mobile payment account, in accordance with certain embodiments.

FIG. 6 schematically shows elements of a system 600 for facilitating mobile device payments using a mobile payment account, in accordance with certain embodiments. A mobile payment service provider 506 may comprise a database 508 that stores data of the mobile payment accounts of the users. The mobile payment service provider 506 may communicate with a mobile device 502 of the user. The mobile device 502 may comprise a memory unit 602 that stores data of the mobile payment account of the user. Additionally, the mobile device may comprise a display 604 configurable to display barcodes. The user may give a command to generate a payment barcode 514 associated with the mobile payment account on the display 604 of the mobile device 502. The payment barcode 514 may be scanned by a barcode scanner of a third party organization 606 or by another mobile device. The third party organization 606 may be an organization providing products or services for which the user wishes to pay. After scanning the payment barcode, the third party organization 606 may send a payment request 608 to the mobile payment service provider 506. After retrieving the data of the mobile payment account from the scanned barcode 610, the mobile payment service provider 506 may charge the mobile payment account by transferring funds from the mobile payment account to the account of the third party organization 606.

Figure 7:
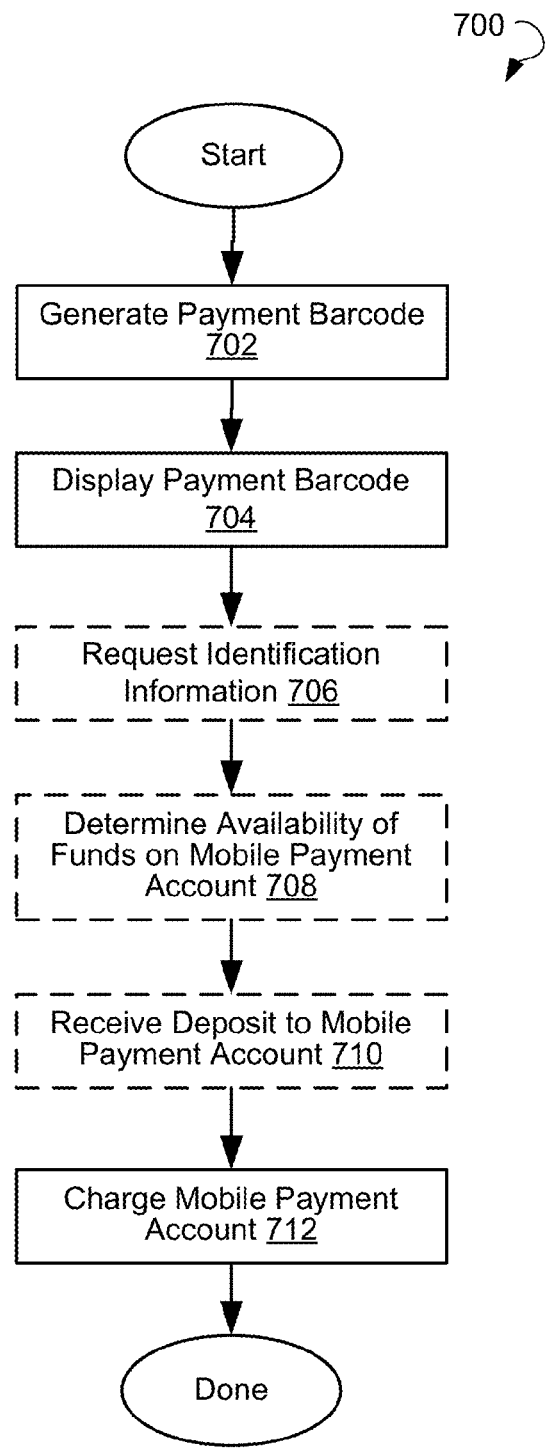
FIG. 7 is a flow chart illustrating a method for facilitating mobile device payments using a mobile payment account, in accordance with certain embodiments.

FIG. 7 is a flow chart illustrating a method for facilitating mobile device payments using a mobile payment account, in accordance with certain embodiments. Method 700 may start with generating, by a processor of a user mobile device, on a request of a user, a payment barcode in operation 702. The payment barcode may encode data of the mobile payment account of the user. The mobile payment account may be associated with user information and with the mobile payment service provider to which the user provided the user information. The user information may include a name of the user, a social security number of the user, a phone number, an address, a bank account number, an insurance account number, a financial organization account number, and the like. The data of the mobile payment account may be stored on the mobile device. Additionally, the user information associated with the mobile payment account may be stored in a database of the mobile payment service provider.

In some embodiments, before giving a request to generate the payment barcode, the mobile device may be used to capture an image of the product barcode. This image may be then processed by the mobile device to retrieve product information (e.g., UPC or EAN code) encoded in the product code. The product barcode may encode the product information and the information about a payment system of a merchant providing the product. The information encoded in the product barcode and the data of the mobile payment account stored on the mobile device may be used for generating the payment barcode.

Method 700 may proceed with displaying the payment barcode on a display of the user mobile device in operation 704. The displayed payment barcode may be scannable by a barcode scanner. The barcode scanner may include a checkout scanner, a check-in scanner, a mobile device, a wearable personal device, and so forth. The payment barcode displayed on the display of the mobile device may be a linear barcode, a two-dimensional barcode, a three-dimensional barcode, or any other machine readable code.

In certain embodiments, method 700 may include an optional operation 306 that involves requesting identification information to authorize access to the mobile payment account via the interface of the user mobile device. The identification information may include a password, a Personal Identification Number (PIN) code, and biometric authorization including fingerprint scanning, palm scanning, face scanning, and retina scanning. The scanning may be performed using the one or more biometric sensors of the mobile device.

Method 700 may optionally involve determining availability of funds on the mobile payment account in operation 708. The user may give a request by the interface of the mobile device to display the amount of funds available on the mobile payment account. After receiving such request, the mobile payment service provider may transmit the information about the available funds to the mobile device. Then, the data about the amount of funds available on the mobile payment account may be displayed on the display of the mobile device. Alternatively, data of the mobile payment account retrieved from the scanned payment barcode may be used to determine availability of funds.

Method 700 may also optionally involve receiving a deposit to the mobile payment account in operation 710. The user may put the deposit to the mobile payment account via a cash-in automatic transaction machine (ATM), a bank transfer, a transfer from another mobile payment account, and the like. In an example embodiment, the deposit to the mobile payment account may be received using universal digital mobile and wearable device currency.

Finally, method 700 may also involve charging the mobile payment account in operation 712. The mobile payment account may be charged based on a payment request received from a payment receiver. The payment request may be associated with the data of the mobile payment account retrieved from the payment barcode. The funds may be transferred from the mobile payment account of the user to the account of the merchant (receiver). This operation may also involve updating the data of the mobile payment account based on the transferred payment amount.

In some embodiments, the funds may be stored on the mobile payment account in a form of universal digital mobile and wearable device currency. The universal digital mobile and wearable device currency may be a digital currency (paper-less, contact-less, and non-physical) enabling instant payments between users, for example, a seller and a buyer, anytime and anywhere in the world. With the universal digital mobile and wearable device currency, involvement of financial institution, and associated fees and charges, may be avoided. The universal digital mobile and wearable device currency is issued and managed via mobile devices or mobile networks. The universal digital mobile and wearable device currency may be stored on the user mobile device or an on-line wallet, transmitted and received in a peer-to-peer manner via the user mobile device, an on-line resource, and mobile device application. The universal digital mobile and wearable device currency may be owned, transferred, purchased, and sold by the user virtually or in real life.

To protect users, the mobile payment service provider may set limits on operations in the universal digital mobile and wearable device currency, the limits including a limit for a pre-determined period, a number of transactions limit, and a maximum amount per transaction.

Additionally, the universal digital mobile and wearable device currency stored on a user device maybe encrypted, for example, using high standard encryption that is used in military and government applications. Moreover, payments in the universal digital mobile and wearable device currency may be protected by a digital signature and a password. Thus, risk of fraud, chargeback, and identity theft associated with Internet payments may be eliminated.

In some embodiments, the universal digital mobile and wearable device currency may be handled using an interface associated with an on-line wallet, the user mobile device. History of transactions in the universal digital mobile and wearable device currency is stored in a network. Additionally, the use of the universal digital mobile and wearable device currency allows eliminating the need for Payment Card Industry Data Security Standard compliance and expensive security measures.

In some embodiments, the mobile payment service provider may provide micro credit loans, payday loans, long-term loans and short-term loans in the universal digital mobile and wearable device currency.

Thus, the user mobile device may perform a function of a point of sale terminal using the universal digital mobile and wearable device currency. The user mobile device may become a bank terminal, and the user a 24 hour full time banker. Furthermore, the user mobile device may perform a function of payment cards terminal using the universal digital mobile and wearable device currency.

The mobile payment service provider may set an exchange rate for the universal digital mobile and wearable device currency with respect to one or more official state currencies. The universal digital mobile and wearable device currency may be not controller by any national government.

In some embodiments, a transfer from the mobile payment account of the user to an account of the merchant or another mobile payment account may be performed in the universal digital mobile and wearable device currency. Additionally, funds transfers in the universal digital mobile and wearable device currency may be performed to other types of accounts, for example, to the account of the user in an on-line gaming system.

In some embodiments, the universal digital mobile and wearable device currency may be a decentralized universal digital currency based on mobile devices and peer-to-peer internet protocol. The universal digital currency may be exchanged to an official state currency based on an exchange rate set by the mobile payment service provider without an intermediate financial institution.

The universal digital mobile and wearable device currency may be issued by a universal digital mobile and wearable device currency bank that may be a virtual bank holding a deposit of the user. An issue volume of the universal digital mobile and wearable device currency may be a percentage of a total transaction volume of the universal digital mobile and wearable device currency bank. A percentage and an annual issue of the universal digital mobile and wearable device currency may be calculated based on analysis of a number of factors including at least one or a combination of: transaction volume, transaction growth, deposit to expense ratio, total deposit to total transaction ratio, user quantity, virtual loan per a person, virtual debt per a person, universal digital mobile and wearable device currency issue per a person, default risk, and liquidation capacity.

In some embodiments, the mobile payment account may be accessible on platforms iOS, Android, Windows, Linux, Unix, and so forth using a smartphone, a wearable personal digital device, a game console, a personal computer, a tablet personal computer, and a car computer. A non-cash deposit to the mobile payment account may be made by means of a mobile phone, a personal computer, and a wearable personal digital device. A cash deposit to the mobile payment account may be made at a place of the mobile payment service provider.

The password allowing an access to the universal digital mobile and wearable device currency may be in a form of a alphanumeric character, a voice, a scrambled image, a video clip, a gesture of any part of a body. The password may be entered by means of a touch screen, a keyboard, a mouse, or a camera of the mobile device or by means of a remote control of the mobile device.

In some embodiments, the universal digital mobile and wearable device currency may be a digital currency enabling to perform a payment to any person at any time and any place. The universal digital mobile and wearable device currency may be a peer-to-peer electronic digital currency enabling to send mobile device payments or on-line payments directly without a financial institution. Use of the universal digital mobile and wearable device currency may eliminate the risk of a fraud, a chargeback, and an identity theft. The universal digital mobile and wearable device currency may be exchanged by means of the mobile device using a national currency exchange rate or a virtual wallet. To perform or verify a transaction, the universal digital mobile and wearable device currency may be accessed via a virtual wallet interface or a cloud server. To each transaction in the universal digital mobile and wearable device currency a transaction fee may be applied.

In some embodiments, the mobile device payments may be performed using wireless communication, such as a Wi-Fi communication. The mobile device payments may include person-to-person, business-to-business, person-to-business, and business-to-person financial transactions. The mobile payment service provider may issue a payment barcode encoding payment card information. A payment card may include a credit card, a debit card, a gift card, a discount card, and a coupon card.

Figure 8:
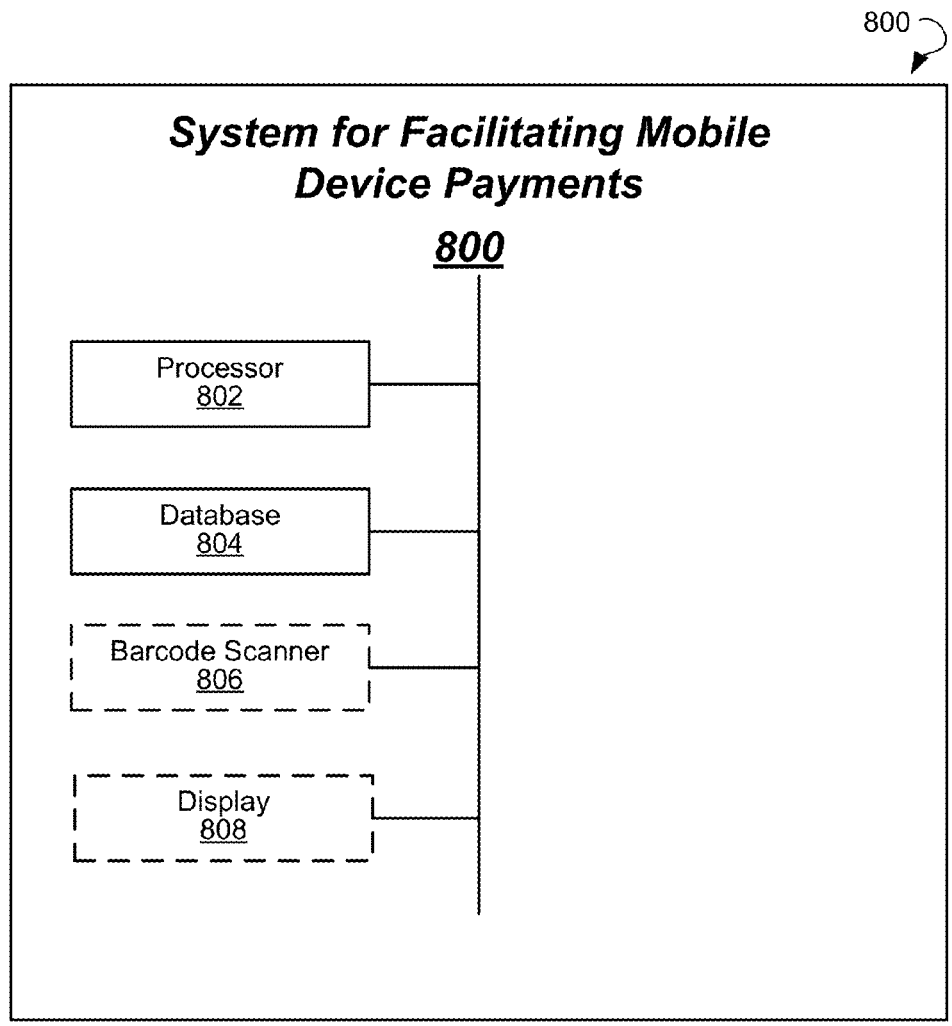
FIG. 8 is a block diagram showing various modules of a system for facilitating mobile device payments using a mobile payment account, in accordance with certain embodiments.

FIG. 8 is a block diagram showing various modules of system 800 for facilitating mobile device payments using a mobile payment account, in accordance with certain embodiments. Specifically, system 800 may include a processor 802 for generating a payment barcode encoding data of the mobile payment account, displaying the payment barcode on a display of a user mobile device and charging the mobile payment account. In certain embodiments, system 800 may include a database 804 in communication with the processor for storing data of the mobile payment account of the user. System 800 may optionally include a barcode scanner 406 for scanning a payment barcode displayed on a display of a mobile device. The barcode scanner may include a camera or a special-purpose device for barcode scanning. The displayed barcode may encode data of the mobile payment account. System 800 may also optionally include a display 808 for displaying the data of the mobile payment account of the user. In certain embodiments, display 808 may be provided at a device of a payment receiver.

In some embodiments, the processor 802 may generate a receipt barcode, the receipt barcode being scannable by a barcode scanner or a user device. On the scan, a refund operation may be initiated.

Another possible embodiment of the present disclosure may be a mobile payment device for mobile device payments using a mobile payment account. The mobile payment device may comprise a processor configured to generate a payment barcode or receive the payment barcode from an on-line resource. The payment barcode may encode data of the mobile payment account.

The generated or received payment barcode may be displayed on a display of the mobile payment device. The displayed barcode may be scanned by a barcode scanner or a user device. The barcode may encode transaction information and information about a mobile payment account of the user. The information about the mobile payment account and/or transaction information may be stored in a memory unit. The mobile payment account may be associated with the user information.

Provided also is a system for mobile payments between a seller and a buyer. The system may comprise a seller device, a buyer device, and a server of a mobile service provider.

The seller device may comprise a processor configured to generate a payment barcode. The payment barcode may encode data of the mobile payment account of the seller and/or transaction information. The generated barcode may be displayed on a display seller device. The displayed payment barcode may be scanned the buyer device.

The seller device may further comprise a memory unit configured to store transaction information and data of the mobile payment account of the seller. The mobile payment account may be associated with seller information.

The buyer device may comprise a camera configured to capture an image of the payment barcode displayed, for example on the display of the seller device. The image of the payment barcode may be processed by a processor of the buyer device and the transaction information and/or data of the mobile payment account of the seller may be extracted from the image and transmitted the mobile service provider. In some embodiments, the extracted information may be displayed on a display of the buyer device.

The server of the mobile service provider may comprise a processor configured to receive the transaction information and charge a mobile payment account of the buyer based on the transaction information. Information associated with the mobile payment account of the seller and the mobile payment account of the buyer may be stored in a database of the server of the mobile service provider.

In an example embodiment, the processor of the system for facilitating mobile and wearable device payments and multimedia transfer may be operable to provide facilities for selection of a call mode and a payment transfer mode by the sender. Furthermore, the processor may be operable to receive, from the sender, the selection of the call mode or the payment transfer mode. Upon selection of the call mode, the processor may be operable to provide a call list and a list of recent calls and transactions. The processor may be operable to receive, from the sender, a selection of the recipient from the call list or the list of recent calls and transactions. Upon selection of the payment transfer mode, the processor may be operable to provide a barcode via a display of the mobile and wearable device associated with the sender. The barcode may encode the payment data associated with the sender and an image of a sender face. The processor may be further operable to receive, from the sender, a selection of a data transfer mode. The data transfer mode may include scanning a barcode encoding payment data associated with the recipient, selecting the recipient from the contact list stored on the mobile and wearable device associated with the sender, and receiving the payment data associated with the recipient via Bluetooth. Furthermore, the processor may be operable to provide data related to location of one or more stores associated with the mobile payment service. Selection of the call mode and the payment transfer mode is shown in detail on FIG. 9.

Figure 9:
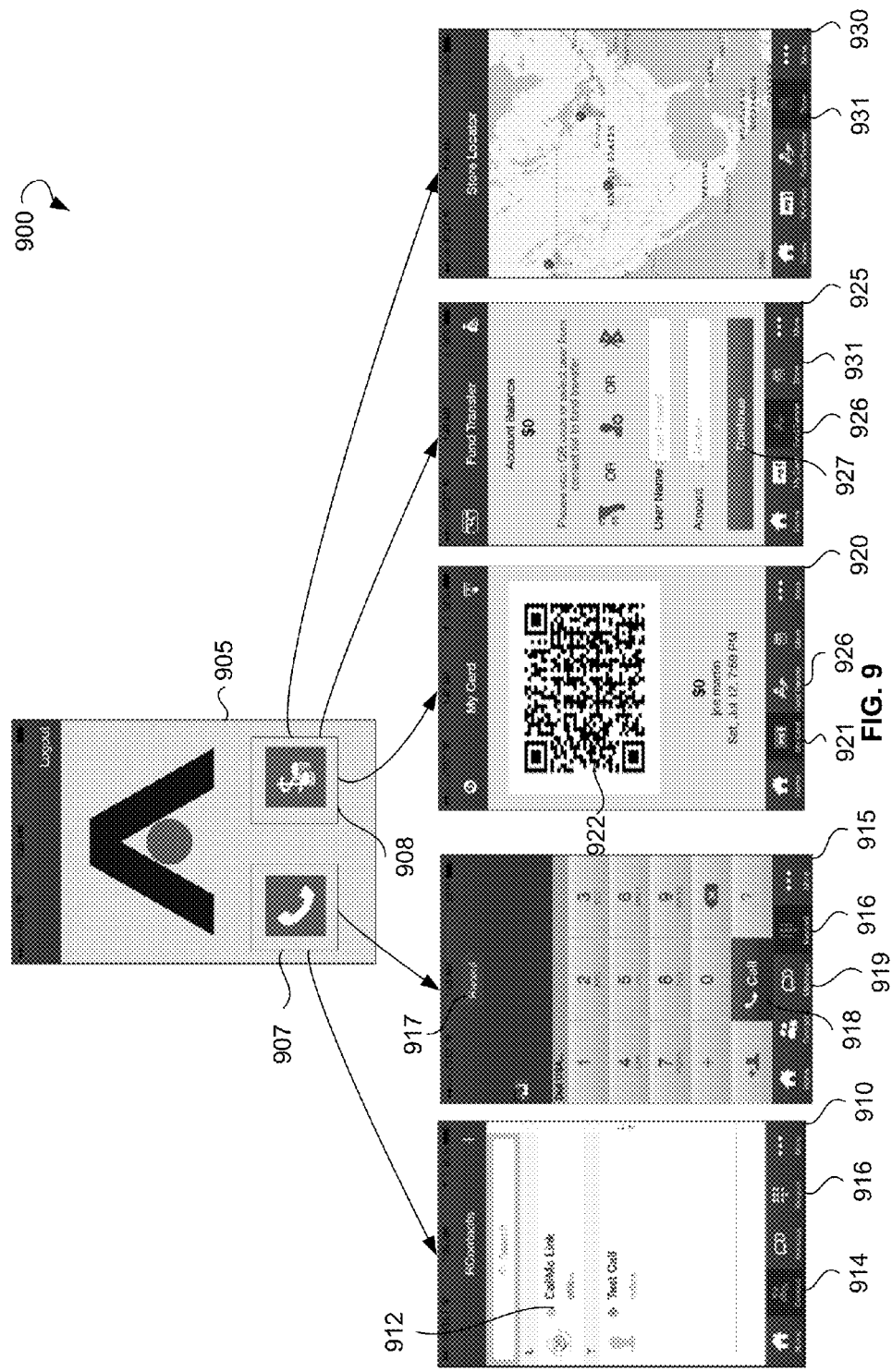
FIG. 9 is a schematic diagram of screens of a user interface for facilitating mobile and wearable device payments and multimedia transfer, in accordance with certain embodiments.

FIG. 9 is a schematic diagram 900 of example screens 905, 910, 915, 920, 925, and 930 of a user interface for facilitating mobile and wearable device payments and multimedia transfer. A screen 905 may represent options to select a call mode (shown as an icon 907) and to select a payment transfer mode (shown as an icon 908). When the sender selects the icon 907, a screen 910 showing a contact list 912 may be displayed. The screen 910 may correspond to a "Contact" icon 914. The sender may select a person to be called, i.e. a recipient, from a contact list 912. Upon selecting a "Keypad" icon 916, a screen 915 may be displayed. The sender may enter a number of the person to be called or select the person from a list 917 of recent calls and transactions and press a "Call" icon 918 to make a call. Upon selecting a "Message" icon 919, the sender may create and send a message to the person from the contact list or to any other person.

When the sender selects the icon 908 on the screen 905, a screen 920 may be displayed. The screen 920 may correspond to a "My Card" icon 921. A code, such as a QR-code 922 may be displayed on the screen 920. The QR-code 922 may encode the payment data of a payment card of the sender, a balance of the payment card, and so forth. When the sender wants to make a payment transfer, a "Fund Transfer" icon 926 may be selected. Upon selection of the "Fund Transfer" icon 926, a screen 925 may be displayed. The screen 925 may represent the current balance of the payment card of the sender. The sender may select a data transfer mode to receive payment data associated with a recipient to which the payment is to be transferred. For example, the sender may scan a QR-code associated with the recipient and encoding the payment data of the recipient. Furthermore, the sender may select the recipient from the contact list or the list of recent calls and transactions. In an example embodiment, the sender may receive the payment data of the recipient via Bluetooth. The sender may enter a name of the recipient and the amount of the payment to be transferred and select a "Continue" icon 927 to finalize the payment transfer. Upon selection of a "Store" icon 931, a screen 930 may be displayed representing stores at which payment transfer via mobile and wearable devices is available.

Figure 10:
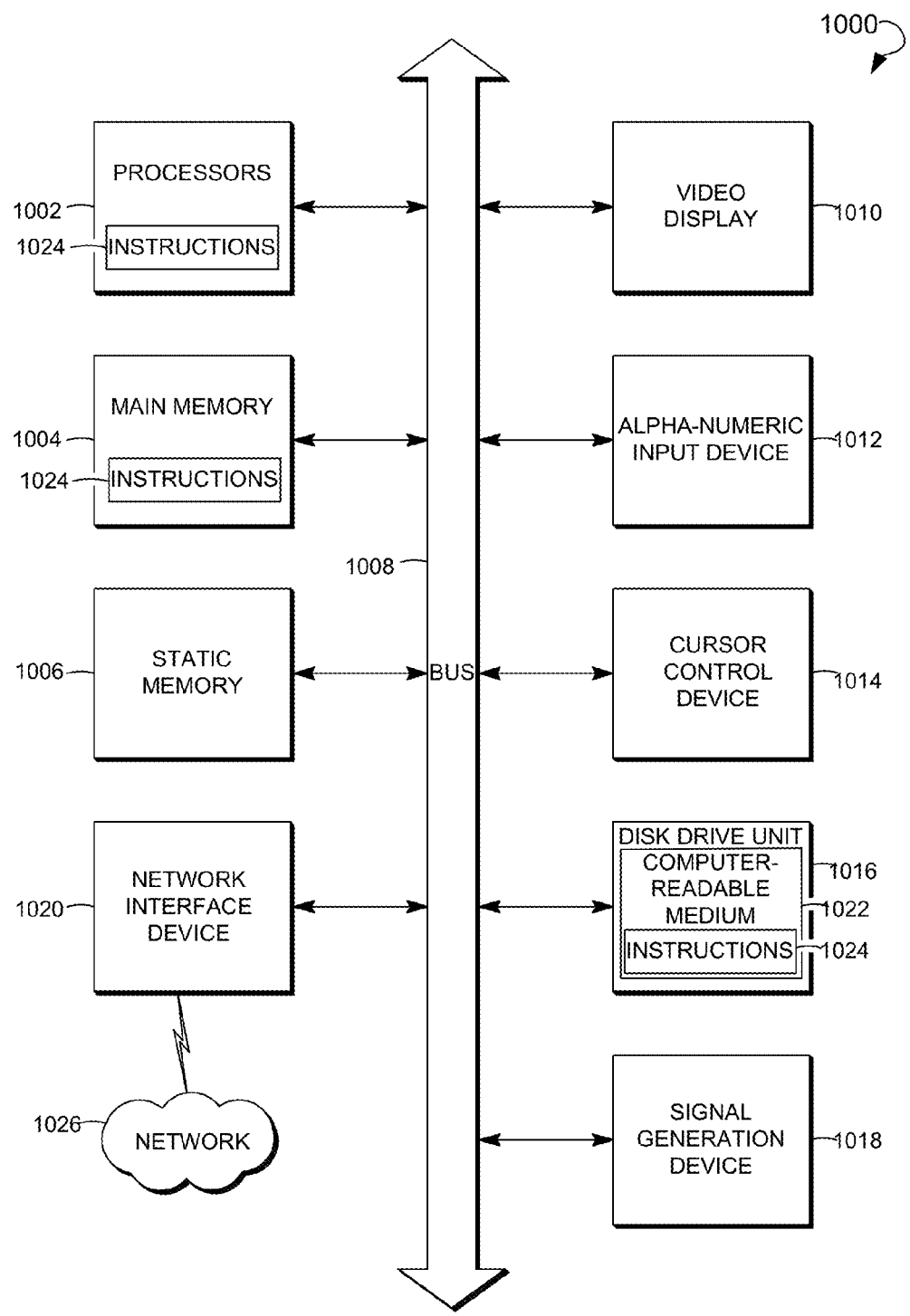
FIG. 10 is a schematic diagram illustrating an example of a computer system for performing any one or more of the methods discussed herein.

FIG. 10 shows a diagrammatic representation of a machine in the example electronic form of a computer system 1000, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 may also include an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a computer-readable medium 1022, on which is stored one or more sets of instructions and data structures (e.g., instructions 1024) embodying or utilized by any one or more of the methodologies or functions described herein. The instructions 1024 may also reside, completely or at least partially, within the main memory 1004 and/or within the processors 1002 during execution thereof by the computer system 1000. The main memory 1004 and the processors 1002 may also constitute machine-readable media.

The instructions 1024 may further be transmitted or received over a network 1026 via the network interface device 1020 utilizing any one of a number of well-known transfer protocols (e.g., Hyper Text Transfer Protocol (HTTP)).

While the computer-readable medium 1022 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for facilitating mobile and wearable device payments and multimedia transfer have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer implemented method for facilitating mobile and wearable device payments and multimedia transfer, the method comprising:
   receiving, by one or more processors, a multimedia transfer request from a mobile and wearable device associated with a sender;
   receiving, by the one or more processors, a recipient identifier, the recipient identifier being associated with a mobile and wearable device associated with a recipient;
   transferring, by the one or more processors, based on the recipient identifier, the multimedia content to the recipient;
   wherein the sender and the recipient are registered in a mobile payment service associated with the mobile and wearable device associated with the sender and the mobile and wearable device associated with the recipient, wherein the mobile payment service is associated with a digital currency;
   receiving, by the one or more processors, from the sender, a currency transfer request;
   customizing, by the one or more processors, the digital currency associated with the sender in the mobile payment service, wherein the customization includes forming at least an image of the senders face assembled in a currency bill as the digital currency stored on the mobile and wearable device associated with the sender, the image of the senders face having been previously registered on the mobile and wearable device associated with the sender;
   verifying, in response to the receiving of the currency request, an identity of the sender, wherein the verifying includes:
      capturing a verification image of the sender face;
      comparing the image of the sender face and the verification image of the sender face; and
      determining that unique patterns associated with the image of the sender face match unique patterns associated with the verification image;

receiving, by the one or more processors, from the sender, the transaction request, the transaction request including one or more of a currency amount, the recipient identifier, and payment data associated with the sender, wherein the transaction request is associated with transaction data;

encrypting, by the one or more processors, the transaction data, the transaction data including one or more of the currency amount and the payment data associated with the sender; and upon completion of the verifying, performing, by the one or more processors, a transaction based on the transaction request, the transaction including sending the digital currency associated with the sender to the mobile and wearable device associated with the recipient which displays the digital currency thereon and converts the received digital currency associated with the sender into digital currency associated with the recipient by replacing the image of the sender with the image of the recipient, debiting the sender and crediting the recipient, and storing the converted digital currency in the mobile and wearable device associated with the recipient;

wherein the mobile payment service provides at least a cross-platform messaging service, a Voice over Internet Protocol (VoIP) service, and an Over-the-Top (OTT) service; and wherein the mobile payment service is associated with fingerprint payments by swiping a finger across a touchscreen of the mobile and wearable device associated with the sender and is further associated with one or more of the following: transactional payments based on Unstructured Supplementary Service Data (USSD), Short Message Service (SMS), direct operator billing, credit card mobile payments, prepaid card payments, online wallets, QR-code payments, contactless near field communication, cloud-based mobile payments, audio signal-based payments, Bluetooth Low Energy (BLE) signal beacon payments, in-application payments, software development kit (SDK) payments, application programming interface (API) payments, social networking payments, and direct carrier/bank co-operation.

2. The method of claim 1, wherein the multimedia transfer request includes one or more of a text transfer request, a video transfer request, an image transfer request, an audio transfer request, an animation transfer request, and a geographical location data transfer request.

3. The method of claim 1, wherein the image is selected from an image of a sender face, an image of a public figure, and an image of a movie character.

4. The method of claim 3, further comprising performing verification of the sender face to prevent an identity theft, wherein the verification is based on sender face recognition.

5. The method of claim 1, wherein the encrypting includes assigning a unique key to the transaction data.

6. The method of claim 5, further comprising sending the unique key to an encryption verification unit, wherein the encryption verification unit includes a key storage.

7. The method of claim 1, wherein the digital currency is stored at one or more of the following: the mobile and wearable device associated with the sender, the mobile and wearable device associated with the recipient, and a remote server.

8. The method of claim 1, further comprising:
receiving, by the one or more processors, a sales point search request from the mobile and wearable device associated with the sender;
determining, by the one or more processors, based on the a sales point search request, a current location of the mobile and wearable device associated with the sender; and
based on the determining, displaying, by the one or more processors, on the mobile and wearable device associated with the sender, a list of sales points located in proximity to the current location of the mobile and wearable device associated with the sender.

9. The method of claim 1, further comprising:
displaying a barcode on the mobile and wearable device associated with the sender, the barcode encoding the payment data associated with the sender and an image of a sender face.

10. The method of claim 1, further comprising:
uploading the payment data associated with the sender and an image of a sender face to a cloud storage.

11. The method of claim 1, further comprising:
scanning a merchant barcode at a point-of-sale terminal, the merchant barcode being associated with merchant account data; and
retrieving the merchant account data from the merchant barcode.

12. The method of claim 1, further comprising scanning a merchant invoice, the merchant invoice comprising a barcode encoding merchant account data.

* * * * *